(12) United States Patent
Rossi et al.

(10) Patent No.: US 11,030,246 B2
(45) Date of Patent: Jun. 8, 2021

(54) FAST AND ACCURATE GRAPHLET ESTIMATION

(71) Applicant: Palo Alto Research Center Incorporated, Palo Alto, CA (US)

(72) Inventors: Ryan A. Rossi, Mountain View, CA (US); Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 928 days.

(21) Appl. No.: 15/179,724

(22) Filed: Jun. 10, 2016

(65) Prior Publication Data

US 2017/0357905 A1 Dec. 14, 2017

(51) Int. Cl.
*G06F 16/90* (2019.01)
*G06F 16/901* (2019.01)
*G06N 7/00* (2006.01)
*G06N 5/02* (2006.01)

(52) U.S. Cl.
CPC ......... *G06F 16/9024* (2019.01); *G06N 5/022* (2013.01); *G06N 7/005* (2013.01)

(58) Field of Classification Search
CPC ..... G06F 17/10; G06F 16/9024; G06N 7/005; G06N 5/022
USPC ........................................................ 707/798
See application file for complete search history.

(56) References Cited

U.S. PATENT DOCUMENTS

| 7,558,768 B2* | 7/2009 | Parida | G06K 9/6296 |
| | | | 706/12 |
| 8,533,182 B1* | 9/2013 | Charboneau | G06F 16/90335 |
| | | | 707/718 |
| 2004/0204925 A1* | 10/2004 | Alon | G16B 5/00 |
| | | | 703/2 |
| 2007/0239694 A1* | 10/2007 | Singh | G06F 16/9024 |
| 2009/0315890 A1* | 12/2009 | Modani | G06Q 10/10 |
| | | | 345/440 |
| 2010/0198761 A1* | 8/2010 | Meng | G06N 7/005 |
| | | | 706/12 |

(Continued)

OTHER PUBLICATIONS

Bordino, "Mining large network with subgraph count", 2008, 2008 International Eight IEEE Internation Conference on Data Mining (Year: 2008).*

(Continued)

*Primary Examiner* — Pierre M Vital
*Assistant Examiner* — Andrew N Ho
(74) *Attorney, Agent, or Firm* — Shun Yao; Park, Vaughan, Fleming & Dowler LLP

(57) ABSTRACT

Embodiments of the present invention provide a system for fast, accurate, and scalable unbiased graphlet estimation. The system utilizes neighborhood sampling and combinatorial relations to estimate graphlet counts, statistics, and frequency distributions in a small fraction of the computing time of existing systems. The obtained unbiased estimates are highly accurate, and have applications in the analysis, mining, and predictive modeling of massive real-world networks. During operation, the system obtains data indicating vertices and edges of a graph. The system samples a portion of the graph and counts a number of graph features in the sampled portion of the graph. The system then computes an occurrence frequency of a graphlet pattern and a total number of graphlets associated with the graphlet pattern in the graph.

20 Claims, 11 Drawing Sheets

(56) References Cited

U.S. PATENT DOCUMENTS

| | | | | |
|---|---|---|---|---|
| 2012/0005238 A1* | 1/2012 | Jebara | .................... | G06Q 10/04 |
| | | | | 707/798 |
| 2014/0129320 A1* | 5/2014 | Jebara | .................... | G06Q 30/00 |
| | | | | 705/14.42 |
| 2014/0222506 A1* | 8/2014 | Frazer | .................... | G06Q 30/02 |
| | | | | 705/7.29 |
| 2014/0280224 A1* | 9/2014 | Feinberg | ............. | G06F 16/9024 |
| | | | | 707/748 |
| 2015/0026103 A1* | 1/2015 | Goldschmidt | ......... | G06N 7/005 |
| | | | | 706/12 |
| 2015/0178405 A1* | 6/2015 | Hong | ................. | G06F 16/9024 |
| | | | | 707/798 |

OTHER PUBLICATIONS

Leskovec, "Sampling from Large Graphs", 2006, SIGKDD International Conference on Knowledge Discovery and Data Mining (Year : 2006).*

Ahmed et al., "Graphlet Decomposition: Framework, Algorithms, and Applications", Feb. 15, 2016.

* cited by examiner

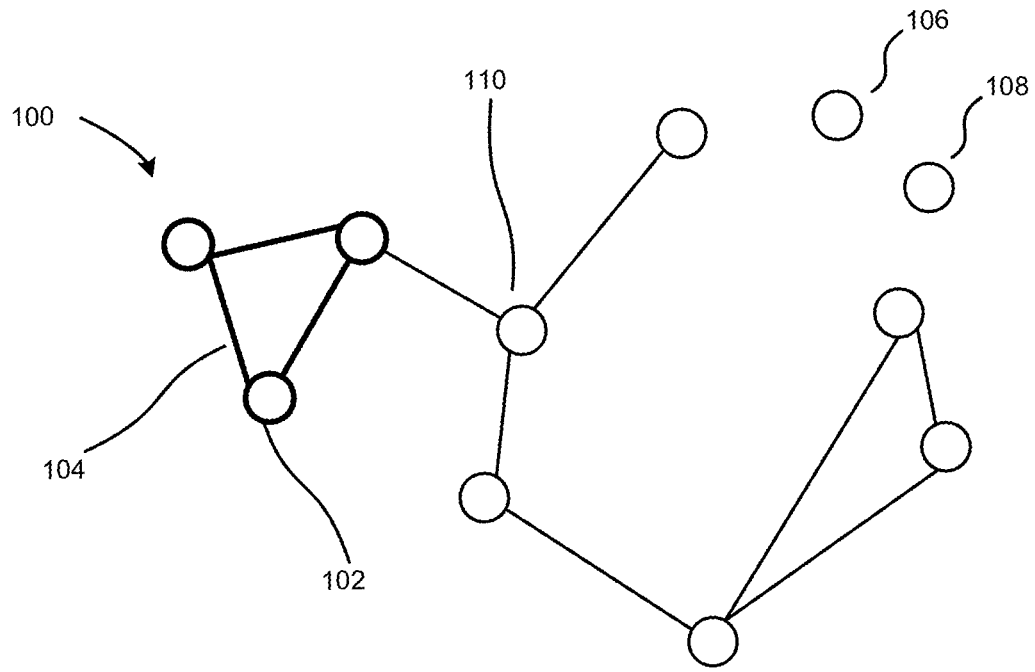
FIG. 1A
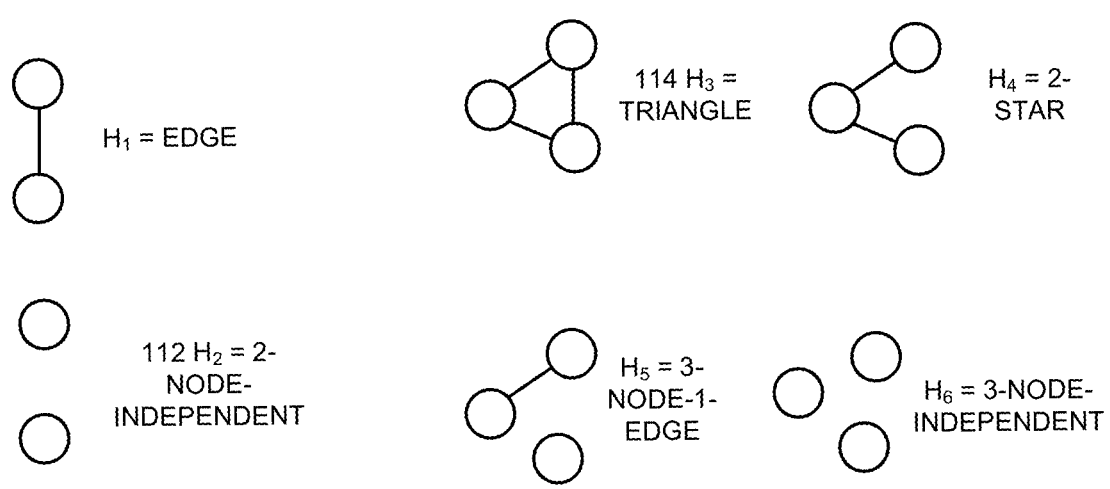
FIG. 1B
FIG. 1C $H_7$ = 4-CLIQUE $H_8$ = CHORDAL-CYCLE $H_9$ = TAILED-TRIANGLE $H_{10}$ = 4-CYCLE

116 $H_{11}$ = 3-STAR $H_{12}$ = 4-PATH $H_{13}$ = 4-NODE-1-TRIANGLE $H_{14}$ = 4-NODE-2-STAR $H_{15}$ = 4-NODE-2-EDGE $H_{16}$ = 4-NODE-1-EDGE $H_{17}$ = 4-NODE-INDEPENDENT

FAST AND ACCURATE GRAPHLET ESTIMATION

BACKGROUND

Field

The present disclosure relates to graphlet estimation. More specifically, this disclosure relates to a method and system for estimating graphlet statistics in a graph based on neighborhood sampling and combinatorial relations.

Related Art

Graphs are representations of edges, also known as links or connections, that connect a set of vertices, also known as nodes. Graphs (also called networks) are important for many applications, including analysis of large data sets such as social networks or consumer-product relationships, and applications in biology and computer science. Graphs are also frequently used to represent relationships between objects in a wide range of domains. For instance, the vertices may represent computers, proteins in a biological network, or road intersections, and the edges may represent communications, interactions, or roads between intersections in a road network. Many graph-computation methods exist, for various purposes, such as predicting relationships and making recommendations. However, large-scale graphs are difficult and time-consuming to analyze, understand, and model.

Because graphs are generally analyzed in terms of their topological properties, it is useful to analyze graphs into smaller subgraph patterns called graphlets, defined by the number of vertices and the pattern of edges between them. Graphlets are induced subgraphs of a large network and are important for understanding and modeling complex networks. Computing subgraph statistics, including counts of particular graphlets, is important, with applications across a wide variety of domains (e.g., bioinformatics, cheminformatics). Recently, graphlets have been shown to improve classification accuracy in domains with relatively small networks representing interactions between proteins and chemical molecules.

Despite their importance, computing subgraph statistics, such as counts of particular subgraph patterns, is computationally intensive. Existing methods to count these higher-order graphlets do not scale, and have focused only on small biological and social networks containing small numbers of vertices and edges. Prior work has only investigated graphlets on relatively small networks due to their inability to scale to large networks, e.g., even extremely small networks with thousands of nodes and edges have recently reported runtimes that exceed days.

SUMMARY

One embodiment of the present invention provides a system and method for graphlet estimation. During operation, the system obtains a data structure indicating vertices and edges of a graph. The system may sample a portion of the graph. The system may count a number of graph features in the sampled portion of the graph. The system may then compute, based on applying a combinatorial relationship to the counted number of graph features, an occurrence frequency of a graphlet pattern in the sampled portion of the graph. The system may then compute, based on the computed occurrence frequency, a total number of graphlets associated with the graphlet pattern in the graph.

In a variation on this embodiment, the system may computing a related local or global subgraph statistic, including a connected graphlet frequency distribution (GFD), a disconnected GFD, a GFD with both connected and disconnected graphlets, a univariate statistic, a probability density function (PDF) for the graphlet pattern, a cumulative distribution function (CDF) for the graphlet pattern, or a complementary cumulative distribution function (CCDF) for the graphlet pattern.

In a variation on this embodiment, the system may use adaptive graphlet estimation. The system may compute an objective function based on minimizing a loss function. The system may then update an error estimate based on the computed objective function. The system may compare the updated error estimate to a pre-specified error bound. Responsive to determining the error estimate exceeds the pre-specified error bound, the system may adjust the sampled portion of the graph to a minimal portion necessary to satisfy the pre-specified error bound.

In a variation on this embodiment, the sampled portion of the graph may comprise an edge neighborhood associated with an edge that connects a first vertex to a second vertex. The number of graph features in the sampled portion of the graph may comprise a number of triangles including the first and second vertices and a third vertex within the edge neighborhood. Computing the total number of graphlets may involve scaling up the occurrence frequency of the graphlet pattern to obtain an unbiased statistical estimator of the total number of graphlets.

In a variation on this embodiment, scaling up the occurrence frequency may involve scaling by a ratio relating a total number of edges in the graph to a number of sampled edge neighborhoods. Scaling up the occurrence frequency may further involve subtracting a second number of graphlets associated with a second graphlet pattern.

In a variation on this embodiment, the system may implement graphlet estimation in parallel, taking advantage of the independence of edge neighborhoods. The sampled portion of the graph may comprise a set of multiple sampled edge neighborhoods. Sampling the portion of the graph may involve assigning a respective sampled edge neighborhood to a respective processor in the set of processors. Counting the number of graph features in the sampled portion of the graph may involve independently counting, by a respective processor, a respective number of triangles within its respective assigned edge neighborhood. Computing the occurrence frequency of the graphlet pattern in the sampled portion of the graph may then involve summing partial occurrence frequencies among the multiple sampled edge neighborhoods.

In a variation on this embodiment, the graphlet pattern includes three or fewer vertices, and applying the combinatorial relationship is a constant-time computation.

BRIEF DESCRIPTION OF THE FIGURES

FIG. 1A illustrates an example of a graph including graphlet patterns.

FIG. 1B illustrates all graphlet patterns of size k=2 vertices.

FIG. 1C illustrates all graphlet patterns of size k=3 vertices.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of fast, accurate, and scalable unbiased graphlet estimation by utilizing neighborhood sampling and combinatorial relations. The methods and systems disclosed herein can accurately estimate graphlet counts, statistics, and frequency distributions, operating in a small fraction of the computing time of existing systems. The obtained unbiased estimates are highly accurate, and have a wide variety of applications in the analysis, mining, and predictive modeling of massive real-world networks. These applications include anomaly detection, role discovery, classification, relational learning, graph similarity, and understanding and exploring large networks. During operation, the system obtains data indicating vertices and edges of a graph. The system samples a portion of the graph and counts a number of graph features in the sampled portion of the graph. The system then computes an occurrence frequency of a graphlet pattern and a total number of graphlets associated with the graphlet pattern in the graph.

FIG. 1A illustrates an example of a graph including graphlet patterns. As illustrated in FIG. 1A, a graph 100 can include vertices such as 102, also called nodes, and edges such as 104, also called links or connections. Because graphs may frequently be analyzed in terms of their topological properties, it is useful to analyze graphs into smaller subgraph patterns defined by the number of vertices and the pattern of edges between them.

As shown in FIG. 1A, a graph can include smaller vertex-induced subgraphs, also called graphlets. For example, vertex 102 takes part in a fully-connected graphlet, or clique, of size k=3 vertices, shown in dark lines. Note that a clique of size k=3 is also called a triangle. Vertices 106 and 108 have no connections, and therefore form a graphlet of size k=2 called the 2-node-independent graphlet. Vertex 110 is the center of a graphlet of size k=4 called a 3-star.

Figure 1D:
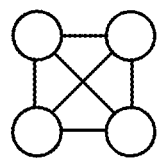
FIG. 1D illustrates all graphlet patterns of size k=4 vertices.
Figure 1D:
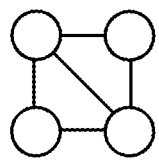
Figure 1D:
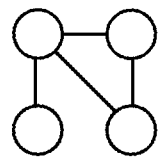
Figure 1D:
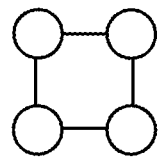
Figure 1D:
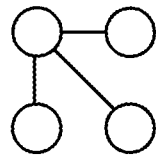
Figure 1D:
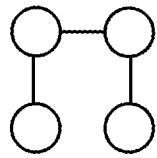
Figure 1D:
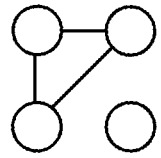
Figure 1D:
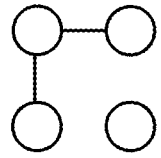
Figure 1D:
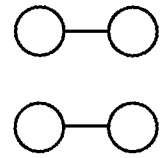
Figure 1D:
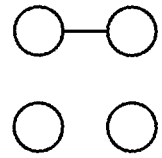
Figure 1D:
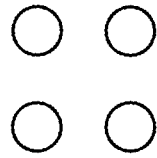

FIG. 1B illustrates all size k=2 graphlet patterns. For example, 112 is the 2-node-independent graphlet pattern, as formed by vertices 106 and 108 in FIG. 1A. Likewise, FIG. 1C illustrates all size k=3 graphlet patterns. For example, 114 is the triangle, as participated in by vertex 102. Finally, FIG. 1D illustrates all size k=4 graphlet patterns. For example, 116 is the 3-star, as participated in by vertex 110. Note that the methods disclosed herein may be generalized to estimate statistics of graphlets of an arbitrary size k, including k>4, as discussed later.

Note that a graphlet may be referred to as connected if there is a path from any vertex to any other vertex in the graphlet, either direct (single-edge) or indirect (multiple edges). Otherwise, the graphlet may be referred to as disconnected. Specifically, graphlets $H_1$ of FIG. 1B, $H_3$ and $H_4$ of FIG. 1C, and $H_7$ through $H_{12}$ of FIG. 1D are connected.

System Architecture

Figure 2:
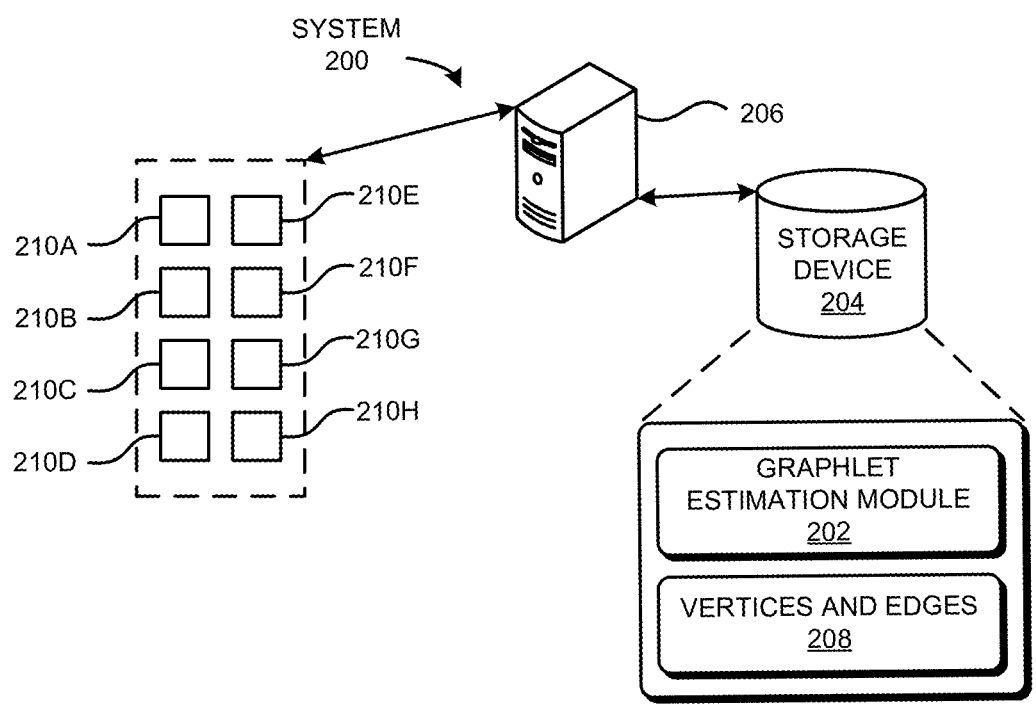
FIG. 2 presents a block diagram illustrating an exemplary architecture of a graph computation system utilizing the graphlet estimation method, according to embodiments of the present invention.

FIG. 2 presents a block diagram illustrating an exemplary architecture of a graph computation system 200 utilizing the graphlet estimation method, according to an embodiment of the present invention. A graph computation system 200 may divide the vertices of a graph and estimate graphlet statistics in a graph, according to embodiments, in parallel with multiple processors. In standard systems, system 200 would require very significant computational cost and space to compute graphlet statistics. However, using the methods disclosed herein, system 200 enables the user to estimate graphlet statistics accurately in far less time and space, and scalably.

Graph computation system 200 may include a graphlet estimation module 202 installed on a storage device 204 coupled to a server 206. Note that various implementations of the present invention may include any number of servers and storage devices. In various implementations, graph management module 202 may include a graph-sampling module or other components of graphlet estimation system 200 to perform the techniques described herein. System 200 may receive data describing vertices and edges, and store such data in storage device 204. System 200 may read the code for graph management module 202 and the data for vertices and edges 208 from storage device 204. System 200 may divide graph neighborhoods or portions of graphs, and assign them to processors, such as processors 210A-210H, which operate on the assigned neighborhoods or portions.

Method for Estimating Graphlet Statistics

Figure 3:
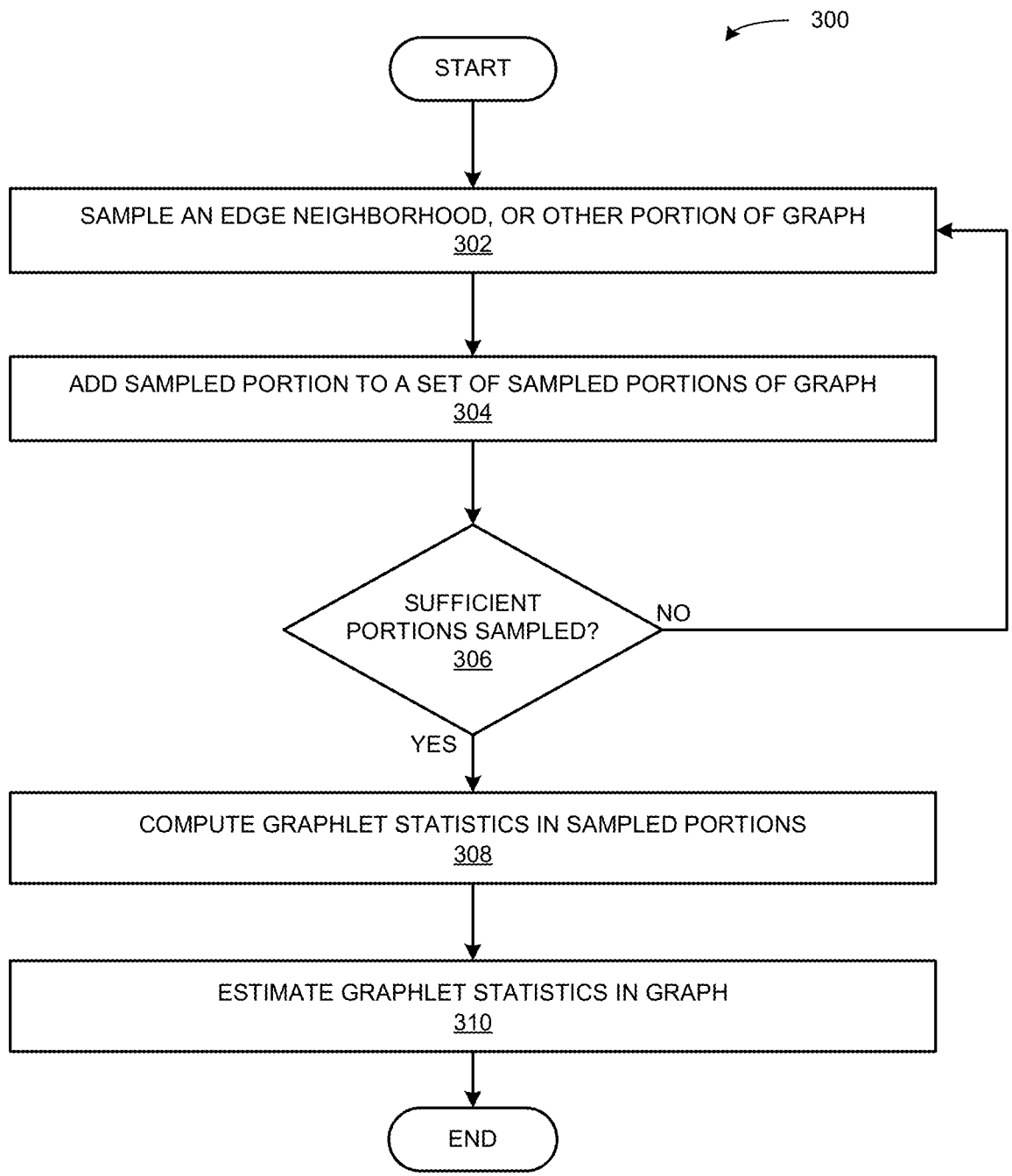
FIG. 3 presents a block diagram illustrating a method for graphlet estimation according to embodiments of the present invention.

FIG. 3 presents a flowchart 300 illustrating a method to estimate graphlet statistics based on sampling a graph, according to embodiments of the present invention. During operation, the system samples an edge neighborhood or other portion of a graph (operation 302). In some embodiments, the system samples portions of a graph via uniform discrete sampling, according to a sampling probability. For example, the system may sample edge neighborhoods by uniformly sampling edges from the set of all edges in the graph, according to a probability p. In some embodiments, p may be specified by a user. In some embodiments, the system uses weighted sampling or an arbitrary sampling probability distribution $p_i$ for graphlet pattern $H_i$. In some embodiments, the system uses weighted sampling to bias estimation towards certain properties or characteristics. In some embodiments, the system uses other sampling criteria, for example sampling edges via a k-core distribution or triangle-core distribution, in ascending or descending order. In some embodiments, the system samples a predetermined number of edge neighborhoods or other portions of a graph. In some embodiments, the system may adjust the sampling criteria adaptively in order to satisfy a desired error bound, as described later in this disclosure. In some embodiments, p=1, i.e. the system may compute graphlet statistics exactly throughout the graph; this is still found to perform hundreds of times faster than prior methods. In some embodiments, the system may perform sampling with replacement (i.e., allowing the same edge neighborhood to be sampled multiple times within the graphlet estimation computation) or without replacement (i.e., sampling an edge no more than once within the graphlet estimation).

The system may then add the sampled portion to a set of sampled portions of the graph (operation 304). The system may then determine whether sufficient portions have been sampled (operation 306). This determination may proceed, for example, by sampling every edge neighborhood or other portion of the graph according to a sampling probability. In some embodiments, determination 306 may proceed by sampling until a predetermined number of edge neighborhoods or portions have been sampled. In some embodiments, determination 306 may proceed according to an adaptive estimation method, such as method 500 described below. Responsive to determining that insufficient portions have been sampled, the system may then repeat the process starting from sampling operation 302.

Responsive to determining that sufficient portions have been sampled from the graph, the system may compute graphlet statistics in the sampled portions (operation 308). The system may then estimate graphlet statistics or distributions for the graph as a whole based on the computed statistics in the sampled portions (operation 310).

Exemplary graphlet statistics computed according to embodiments of the present invention may include counts of a specific graphlet pattern. In some embodiments, the system may compute graphlet frequency distributions (GFD) including the connected GFD, disconnected GFD, and GFD with both connected and disconnected graphlets. In some embodiments, the system may apply transformations (e.g., log) to scale such distributions. For instance, let $Z=\Sigma_{g_i \in G_k} C_i$, then $f(i)=C_i/Z$. In some embodiments, the system computes univariate statistics for a graphlet pattern, such as mean, median, minimum, maximum, range, variance, standard deviation, median deviation, a quartile (such as Q1 or Q3) or other quantile, interquartile range (IQR), etc. In some embodiments, the system may compute probability distributions such as a probability density function (PDF), cumulative distribution function (CDF), or complementary cumulative distribution function (CCDF) for a particular graphlet pattern. For instance, based on the number of 4-cliques per edge: for each edge e in the graph, the system may compute the number of 4-cliques centered at edge e, denoted $C_i$. Afterwards, the system may add 1 to $bin[C_i]$ where $bin[C_i]$ represents the number of edges with $C_i$ 4-cliques. In some embodiments, the system may receive a specification of the graphlet statistics to estimate as input from a user.

Figure 4:
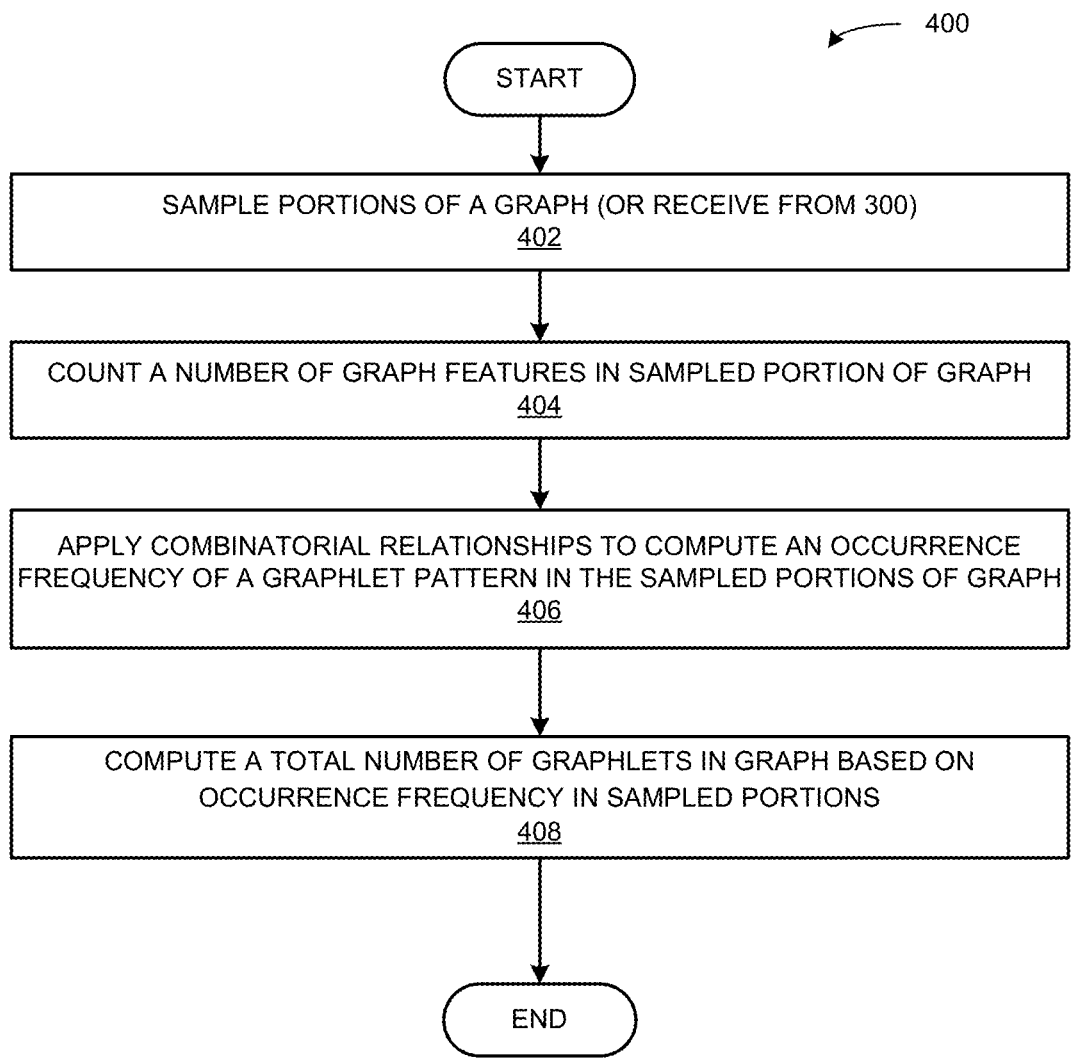
FIG. 4 presents a block diagram illustrating a method for graphlet estimation according to embodiments of the present invention.

FIG. 4 presents a flowchart 400 illustrating details of a method to estimate graphlet statistics given sampled portions of a graph, according to embodiments of the present invention. During operation, the system samples an edge neighborhood or other portion of a graph (operation 402). Alternatively, in step 402, the system may receive the sampled portions of the graph from method 300. The system may then count a number of graph features in the sampled portions of the graph (operation 404). In some embodiments, the counted graph features are triangles and 2-stars. In some embodiments, the counted graph features are 4-cliques and 4-cycles.

But note that the methods disclosed here may be generalized to estimate graphlets of an arbitrary size k, including k>4. Specifically, the system may directly compute the k-graphlets by leveraging k−1 graphlet patterns (lower order subgraph counts). From this small set, k-cliques and/or k-cycles may be computed and combinatorial relationships may be used to compute the other k-graphlet counts directly in constant time. This method is significantly faster (by an order of magnitude) than prior approaches and counts all graphlets of size k by directly enumerating only graphlets of size k−1. This method systematically builds a system of equations, that is, it derives linear relationships between the counts of various graphlet patterns. The counts of the k-graphlets are computed directly through a system of equations representing the dependencies between various k-graphlets using counts for the k−1 graphlets. Note that given a vertex v belonging to a k-vertex graphlet $g_i$, it also participates in a k−1 graphlet. Thus, every k-vertex graphlet can be constructed by adding a vertex to a k−1 graphlet.

After counting a number of graph features, the system may apply combinatorial relationships to compute an occurrence frequency of a graphlet pattern in the sampled portions of the graph (operation 406). The system may then compute a total number of graphlets associated with the graphlet pattern in the graph based on the computed occurrence frequency in the sampled portions of the graph (operation 408). In some embodiments, the system may compute other graphlet statistics associated with the graphlet pattern.

Figure 5:
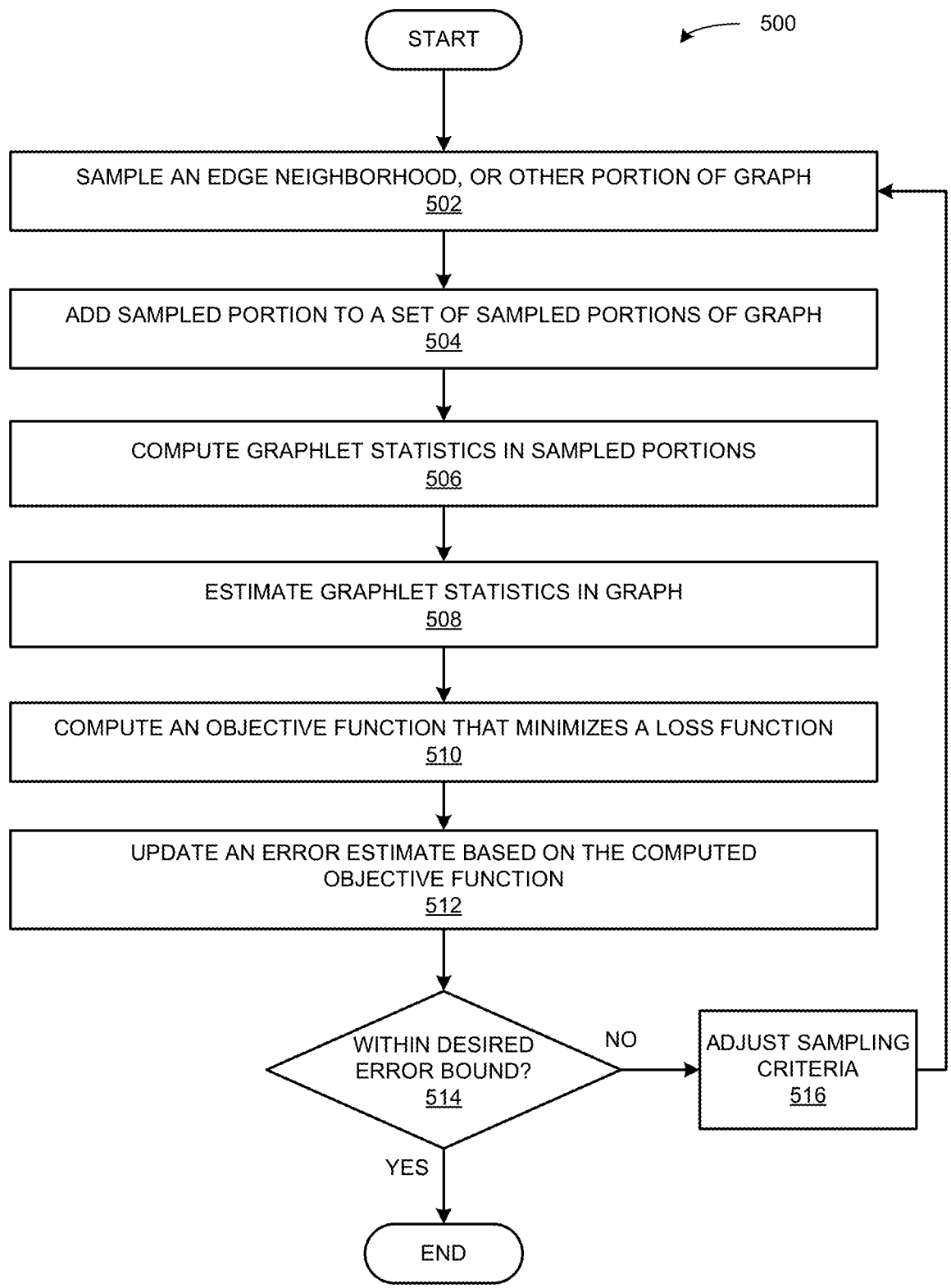
FIG. 5 presents a block diagram illustrating a method for adaptive graphlet estimation within a pre-specified error bound, according to embodiments of the present invention.

FIG. 5 presents a flowchart 500 illustrating a method to estimate graphlet statistics adaptively within a pre-specified error bound, according to embodiments of the present invention. Note that method 500 may be understood as providing more detail of decision 306, i.e. the decision whether sufficient portions have been sampled from the graph, during method 300. In some embodiments, method 500 uses a variance between successive graphlet estimates as a proxy for the error in an estimate.

During operation, the system samples an edge neighborhood or other portion of a graph (operation 502). The system then adds the sampled portion to a set of sampled portions of the graph (operation 504). The system may then compute graphlet statistics in the sampled portions of the graph (operation 506) and estimate graphlet counts, statistics, or distributions in the full graph (operation 508). The system may then compute an objective function to minimize an arbitrary loss function (operation 510). In some embodiments, the loss function may be a relative graphlet estimation error maximized over all graphlet patterns up to size k=4, or over all considered graphlet patterns. In some embodiments, the loss function may be a Kolmogorov-Smirnov (KS) statistic quantifying the distance between two cumulative distribution functions (CDF). In some embodiments, the loss function may be a KL divergence between a first distribution P and a second distribution P'. In some embodiments, the loss function may be a Skew-divergence (SD) approximating KL divergence by smoothing a first distribution P with respect to a second distribution P'. In some embodiments, smoothing may be determined by a parameter $0 \leq \lambda \leq 1$. In some embodiments, the value of the smoothing parameter may be $\lambda=0.99$. In some embodiments, the loss function may be a normalized $L_1$ distance, which is a relative error between the estimated graphlet statistics and the true values, averaged over graphlet patterns. In some embodiments, the loss function may be a squared loss, which is a sum over graphlet patterns of squared error between the estimated graphlet statistics and the true values.

The system may then update an error estimate based on the computed objective function (operation 512). The system may then determine whether the error estimate is within a desired error bound (operation 514). In some embodiments, the desired error bound may be pre-specified by a user. Responsive to determining that the error estimate is not within the desired error bound, the system may adjust the sampling criteria (operation 516) and return to operation 502, i.e. sampling additional portions of the graph. In some embodiments, adjusting the sampling criteria may involve adjusting a total number |J| of samples, where J is a set of all sampled portions of the graph, or may involve adjusting a sampling probability p. In some embodiments, adjusting the total number |J| of samples may further involve increasing |J| by a percent φ of the remaining edges in the graph. In other embodiments, adjusting the total number of samples may further involve increasing |J| by a fixed number of samples in a respective iteration.

Responsive to determining that the error estimate is within the desired error bound, the system may then return the estimated graphlet statistics.

Edge Neighborhoods

Figure 6A:
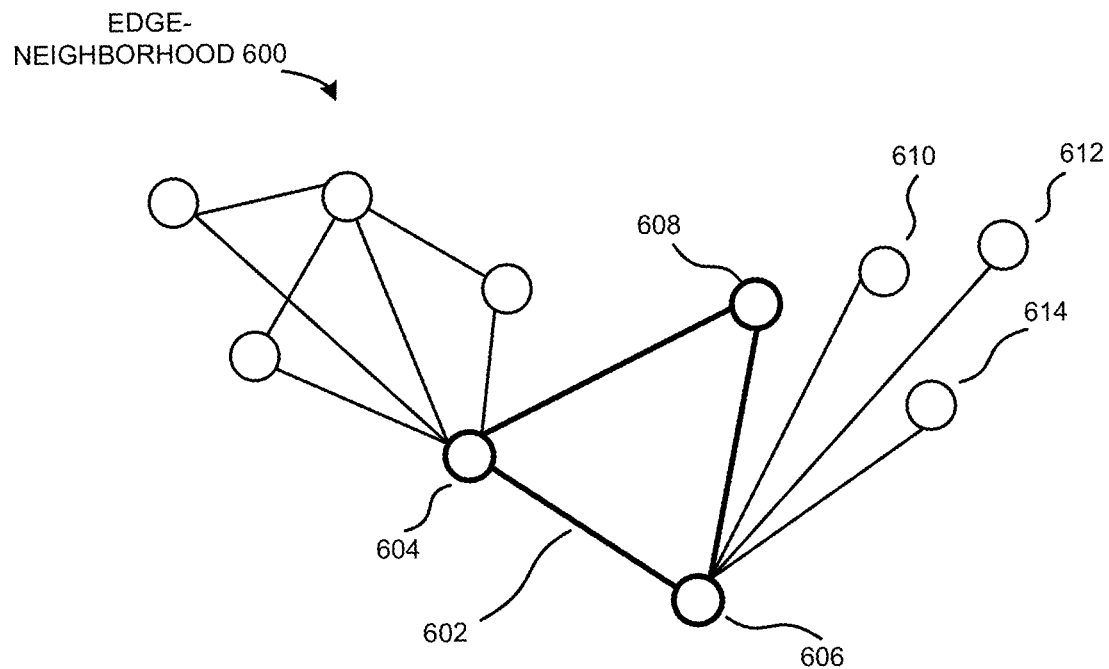
FIG. 6A illustrates an exemplary edge neighborhood, including a triangle graphlet pattern.

An edge neighborhood (also called an edge-induced neighborhood) is defined as an edge e, the two vertices u and v connected by the edge, and the subgraph induced by these two vertices. That is, the edge neighborhood includes all neighbors of the two vertices u and v and all edges connecting them. In some embodiments of the present invention, the system samples the graph by sampling edges and their associated edge neighborhoods. FIG. 6A illustrates an exemplary edge neighborhood 600 based on edge 602 connecting vertices 604 and 606. Exemplary edge neighborhood 600 is the subgraph induced by vertices 604 and 606, i.e. neighborhood 600 includes all neighbors of vertices 604 and 606 and all the edges connecting them.

Note that in some embodiments, the system may sample edge-induced s-neighborhoods, where s represents the distance (in number of edges or 'hops') of vertices from u and v to be included in the neighborhood. For example, the edge neighborhoods defined above, which include only the immediate neighbors of u and v, correspond to s=1, but in some embodiments a larger value of s may be used.

A sampled edge neighborhood may contain a number of graphlets. Specifically, in some embodiments, the system counts triangles and 2-stars that are located in a sampled edge neighborhood, and that contain both vertices u and v defining the edge. For example, edge neighborhood 600 is defined by vertices 604 and 606. As shown in FIG. 6A by dark lines, neighborhood 600 includes vertex 608, which is connected to both vertices 604 and 606, and therefore completes a triangle with these vertices. Likewise, vertices 610, 612, and 614 all complete 2-stars with vertices 604 and 606, as shown. In embodiments of the present invention, the system would count all of these graphlets belonging to neighborhood 600. In some embodiments, the system may count triangles by identifying vertices, such as 608, connected to both vertices u and v defining the edge neighborhood. In some embodiments, the system may store a set $T_e$ of such vertices in memory or non-transitory storage. In some embodiments, the system may count 2-stars by identifying vertices, such as 610, connected to one vertex u or v defining the edge neighborhood, but not the other. In some embodiments, the system may store sets $S_u$ and $S_v$ of such vertices in memory or non-transitory storage.

Figure 6B:
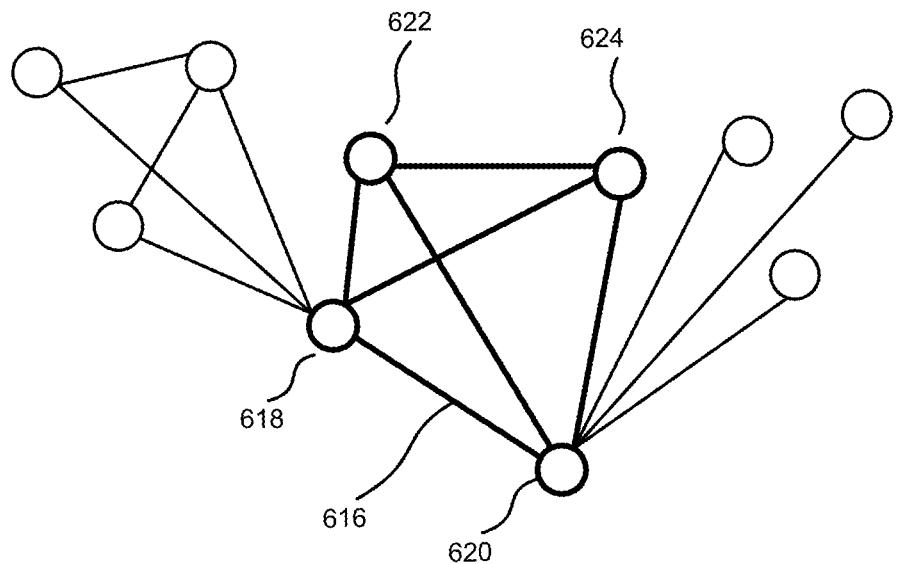
FIG. 6B illustrates an exemplary edge neighborhood, including a 4-clique graphlet pattern.

In some embodiments, the system may also count 4-cliques and 4-cycles in the edge neighborhood that contain both vertices defining the edge. FIG. 6B illustrates an exemplary edge neighborhood defined by edge 616 connecting vertices 618 and 620. As shown by dark lines in the figure, vertices 622 and 624 complete a 4-clique graphlet with vertices 618 and 620. In some embodiments, the system would count all such 4-clique graphlets as well as 4-cycle graphlets belonging to a sampled edge neighborhood.

Note that in some embodiments, the system makes use of previously-counted triangles and 2-stars in order to expedite counting the 4-cliques and 4-cycles. The system may pre-compute triangle-core numbers, numbers of triangles or 2-stars, or the sets $T_e$, $S_u$, and $S_v$ for all needed portions of the graph (for example all sampled edges), and store these results in memory or non-transitory storage. In some embodiments, the system may compute the number of 4-cliques by identifying vertices in the set $T_e$ (i.e. vertices completing triangles with u and v) that are connected to each other. In some embodiments, the system computes the number of 4-cycles by identifying vertices in the set $S_u$ (i.e. those completing 2-stars with u) that are connected to vertices in the set $S_v$ (i.e. those completing 2-stars with v). In some embodiments, the system parallelizes these computations via edge neighborhoods (which can be computed entirely independently of each other). In some embodiments, the system parallelizes these computations within the edge neighborhoods or other sampled portions of the graph.

Combinatorial Relations

In some embodiments of the present invention, the system computes numbers of all patterns of graphlets containing k or fewer vertices in the sampled portions of the graph, for example in sampled edge neighborhoods. In some embodiments, k=4, but note that the methods disclosed herein may be generalized to estimate graphlets of an arbitrary size k (by leveraging k−1 graphlet patterns).

The graphlet counts in the sampled portions are herein referred to as $C_i$, where the subscript i refers to a particular graphlet pattern, as illustrated in FIGS. 1B, 1C, and 1D. Likewise, the graphlet counts in the neighborhood of a particular edge e are herein referred to as $C_i^{(e)}$, so that $C_i = \sum_{e \in J} C_i^{(e)}$, where J is the set of sampled neighborhoods in the graph. Note that in some embodiments, the system may obtain the exact counts $C_i^{(e)}$ or $C_i$ by direct counting for the triangles, 4-cliques, and 4-cycles (i.e., for i=3, 7, and 10), whereas the 2-stars and 3-node-1-edge counts (i.e., i=4 and 5) may be obtained through combinatorial relations. In some embodiments, the system may also obtain the 2-star counts through direct counting.

In some embodiments, the system uses the following combinatorial relations to obtain exact graphlet counts within an edge neighborhood. The relations listed below include both connected and disconnected graphlet patterns. (Note that here $$\binom{n}{k}$$

is the binomial coefficient:

$$\binom{n}{k} = \frac{n!}{k!(n-k)!};$$

$T_e$ refers to the set of vertices completing triangles with the edge e=(u, v) that defines the edge neighborhood; $S_u$ and $S_v$ refer to the sets of vertices completing 2-stars centered at u and v, respectively; $\Gamma(u)$ and $\Gamma(v)$ are the sets of vertices connected to u and v, but excluding u and v, respectively; $d_u$ and $d_v$ are the degrees of u and v, respectively; and n and m are the numbers |V| of vertices and |E| of edges in the graph, respectively).

$$C_4^{(e)} = d_u + d_v - 2 - 2|T_e| = |S_u| + |S_v|$$

$$C_5^{(e)} = n - C_4^{(e)} + |T_e| - 2$$

$$C_8^{(e)} = \binom{|T_e|}{2}$$

$$C_9^{(e)} = |S_u| \cdot |S_v|$$

$$C_{11}^{(e)} = \binom{|S_u|}{2} + \binom{|S_v|}{2}$$

$$C_{12}^{(e)} = |T_e| \cdot (|S_u| + |S_v|)$$

$$C_{13}^{(e)} = (|S_u| + |S_v|) \cdot (n - |\Gamma(u) \cup \Gamma(v)|)$$

$$C_{14}^{(e)} = T_e \cdot (n - |\Gamma(u) \cup \Gamma(v)|)$$

$$C_{15}^{(e)} = \binom{n - |\Gamma(u) \cup \Gamma(v)|}{2}$$

$$C_{16}^{(e)} = m - |\Gamma(u) \setminus \{v\}| - |\Gamma(v) \setminus \{u\}| - 1.$$

Note that in some cases, the counts $C_i$ obtained from these combinatorial formulas are not counts of the corresponding graphlet pattern i. Instead, they may be intermediate values that must be processed further to obtain the graphlet counts. For example, the total count of chordal-cycle graphlets (type $H_8$ in FIG. 1D) is related to $C_8 - C_7$, rather than $C_8$ directly. However, note that substituting the $C_i$ as computed here into the scaling-up formulas given below will result in estimates $X_i$ of numbers of graphlets in the full graph.

Scaling Up Graphlet Estimates

As described above, in some embodiments of the present invention, the system obtains exact graphlet counts within a sampled portion of a graph, either by direct counting or by applying exact combinatorial relations. Once they have been obtained, the counts may be used to derive estimates of the graphlet statistics throughout the graph. Note that these scaled-up graphlet estimates may provide unbiased statistical estimators of the true graphlet statistics in the graph as a whole. Here we discuss scaling-up the estimates for graphlets up to size k=4, but note the system may also estimate graphlets of arbitrary size k.

The graphlet counts in the sampled portions are herein referred to as $C_i$, where the subscript i refers to a graphlet type, as in FIGS. 1B, 1C, and 1D. Likewise, the scaled-up graphlet count estimates are herein referred to as $X_i$, and the true full-graph counts as $Y_i$. Scaling up the graphlet counts $C_i$ to full-graph estimates $X_i$ may involve multiplying the counts by a reciprocal sampling probability $1/p_i$ and by a topological factor $W_i$: $X_i = W_i C_i / p_i$. In some embodiments, the reciprocal sampling probability is independent of graphlet type i: $1/p_i = 1/p = |E|/|J|$, where |E| is the total number of edges in the graph, and |J| is the total number of sampled edge neighborhoods. In some embodiments, the topological factor prevents over-counting by correcting for the number of edges $E_i$ in the graphlet pattern is $W_i = 1/E_i$.

For example, the formulas for scaling-up graphlets of types triangle, 2-star, 3-node-1-edge, 4-clique, and 4-cycle follow the general rule mentioned above:

$$X_i = (C_i |E|)/(|J| E_i), \text{ with } i=3, 4, 5, 7, \text{ or } 10.$$

Note that in some embodiments, the system obtains the exact counts $C_i$ by direct counting for the triangles, 4-cliques, and 4-cycles, whereas the 2-stars and 3-node-1-edge counts may be obtained through combinatorial relations, as described above. In some embodiments, the system may also obtain the 2-star counts through direct counting.

In some embodiments, scaling up the graphlet counts $C_i$ to full-graph estimates $X_i$ may be more complex. Specifically, in some embodiments, the remaining graphlet patterns are not counted directly in the sampled portions of the graphs. Instead, as described above, in some embodiments, the system applies combinatorial relations to infer these remaining graphlet counts $C_i$ from already-computed ones in constant time.

In some embodiments, the system may estimate the remaining full-graph statistics, such as $X_i$, directly from already-computed values in constant time. Thus, in some embodiments, for the remaining graphlet patterns, the following formulas may be used for scaling-up the graphlet counts. (Note that here $$\binom{n}{k}$$

is the binomial coefficient $$\binom{n}{k} = \frac{n!}{k!(n-k)!},$$

and $C_i$ refer to the graphlet counts as obtained from the formulas given above).

$$X_6 = W_6 \left[ \binom{n}{3} - X_3 - X_4 - X_5 \right], W_6 = 1$$

$$X_8 = W_8 \cdot \frac{1}{p_8} \cdot (C_8 - C_7), W_8 = 1$$

$$X_9 = W_9 \left( \frac{1}{p_9} \cdot C_9 - 4X_8 \right), W_9 = \frac{1}{2}$$

$$X_{11} = W_{11} \left( \frac{1}{p_{11}} \cdot C_{11} - X_9 \right), W_{11} = \frac{1}{3}$$

$$X_{12} = W_{12} \cdot \frac{1}{p_{12}} \cdot (C_{12} - C_{10}), W_{12} = 1$$

$$X_{13} = W_{13} \left( \frac{1}{p_{13}} \cdot C_{13} - X_9 \right), W_{13} = \frac{1}{2}$$

$$X_{14} = W_{14} \left( \frac{1}{p_{14}} \cdot C_{14} - 2X_{12} \right), W_{14} = 1$$

$$X_{15} = W_{15} \left( \frac{1}{p_{15}} \cdot C_{15} - 6X_7 - 4X_8 - 2X_9 - 4X_{10} - 2X_{12} \right), W_{15} = \frac{1}{2}$$

$$X_{16} = W_{16} \left( \frac{1}{p_{16}} \cdot C_{16} - 2X_{15} \right), W_{16} = \frac{1}{3}$$

$$X_{17} = W_{17}\left(\binom{n}{4} - \sum_{i=7}^{16} 4X_i\right), W_{17} = 1.$$

Note that the above-described scaling-up formulas are unbiased statistical estimators $X_i$ of the true full-graph values $Y_i$. The proof of this statement follows from the fact that the graphlet counts are exact within the sampled regions, so the statistical expected value of the graphlet count for any sampled portion of the graph is simply the count in that portion times the probability of sampling that portion. Likewise, the mean squared error (MSE) of the estimator $X_i$ is simply the statistical variance of $X_i$.

Performance, Experiment Results, and Applications

Figure 7A:
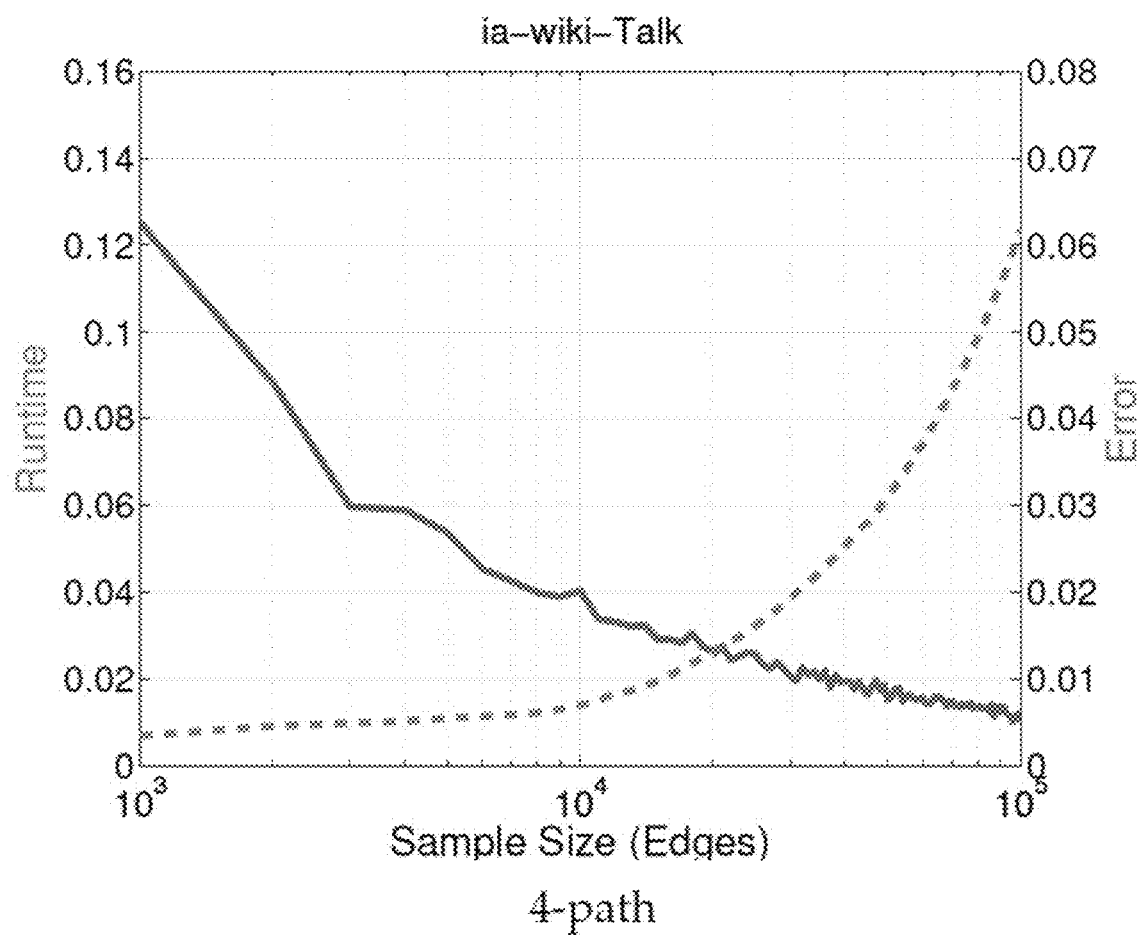
FIG. 7A illustrates runtime and error performance of the present invention, based on experimental results.

FIG. 7A shows exemplary runtime and error performance of the present invention, based on experimental results obtained by the inventors using adaptive estimation methods like in method 500. As illustrated in the figure, in some embodiments, the system can trade off greater accuracy in exchange for better computational speed, while still performing very well with respect to both of these criteria. As illustrated, greater accuracy was obtained by increasing the sample size, whereas faster computation time was achieved by decreasing the sample size.

The inventors also performed a large trial of estimating graphlet statistics in a variety of large sparse graphs and dense graphs, including networks with millions or even over a billion edges. The accuracy of the disclosed method relative to the true graphlet statistics was generally found to be 0.1% or better. Moreover, the disclosed method was found (averaged over 300 graphs) to be over 200,000 times faster than prior methods. In many instances, the disclosed method took less than one second to obtain estimates with better than 0.1% accuracy for each graphlet pattern, whereas prior methods exceeded a day to process the same graphs.

As mentioned above, the disclosed methods may parallelize extremely well because the sampled portions, such as edge neighborhoods, may be sampled and processed independently by separate processing units. The inventors' experimental results for several large networks showed very good parallel scaling, with parallel speedup (decrease in elapsed computational time) of 12 to 15 times on 16 cores.

As described above, the system may provide an unbiased statistical estimator $X_i$ of graphlet statistics $Y_i$ in the full graph. Therefore, confidence intervals may be given as:

$$X_i - z_{\alpha/2}\sqrt{\mathbb{V}[X_i]} \leq Y_i \leq X_i + z_{\alpha/2}\sqrt{\mathbb{V}[X_i]}.$$

Figure 7B:
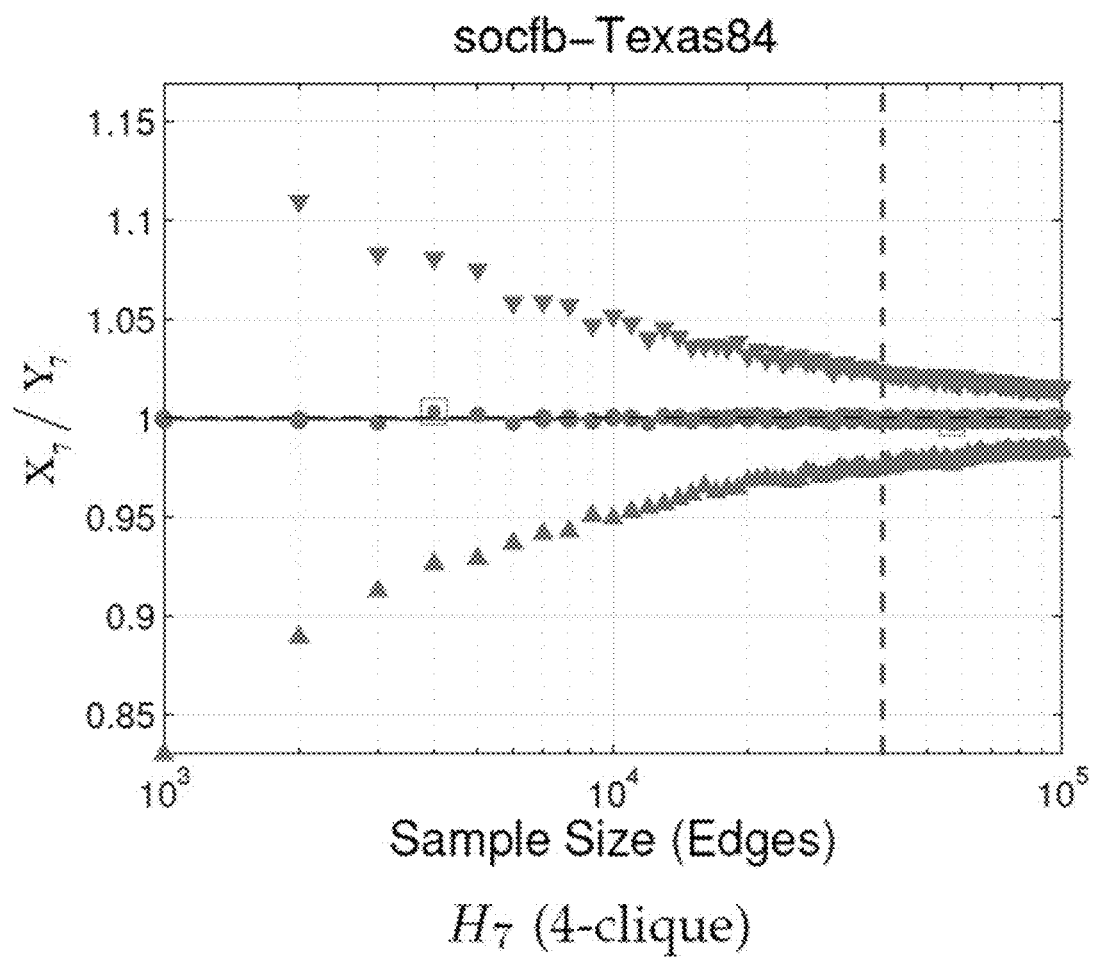
FIG. 7B illustrates confidence intervals for graphlet estimates obtained by the present invention, based on experimental results.

Here $\mathbb{V}[X_i]$ is the statistical variance in $X_i$, and $\alpha = 5\%$, $z_{\alpha/2} = 1.96$ for a 95% confidence interval. The inventors' experimental results for numerous large networks showed that the confidence intervals were centered and balanced over the true graph statistic. Upper and lower bounds always contained the true value. As the sample size increased, the bounds converged to the actual value of the graphlet statistic. Confidence bounds were within ±5% of the true value for all graphs and subgraph patterns. Notably, the experimental results showed the method has excellent accuracy even at small sample sizes. For example, FIG. 7B illustrates confidence intervals for graphlet estimates obtained by the present invention, based on experimental results. FIG. 7B shows typical exemplary results, with 95% confidence bounds within approximately ±2.5% of the true value for a sample size of just 40,000 sampled edge neighborhoods (vertical dashed line). In the figure, the circles show the estimated full-graph number of 4-cliques relative to the exact number, $X_7/Y_7$, and the downward- and upward-facing triangles represent the upper and lower bounds of the 95% confidence interval, respectively.

The system disclosed herein is useful for a wide variety of applications including anomaly detection, role discovery, classification, relational learning, graph similarity, and as a tool for understanding and exploring large networks. Thus, the present invention can support real-time interactive queries for visual graph mining, learning and extracting roles, exploratory analysis, and predictive modeling tasks (such as relational classification and anomaly detection).

For instance, the estimated local graphlets may be used to quickly spot large cliques and stars based on the 4-vertex graphlets. Moreover, these large cliques and stars can often be used to spot and visually identify the largest possible clique and star in the graph. This is particularly remarkable since the maximum clique problem is well-known as an NP-hard problem with many applications.

Exemplary Apparatus

Figure 8:
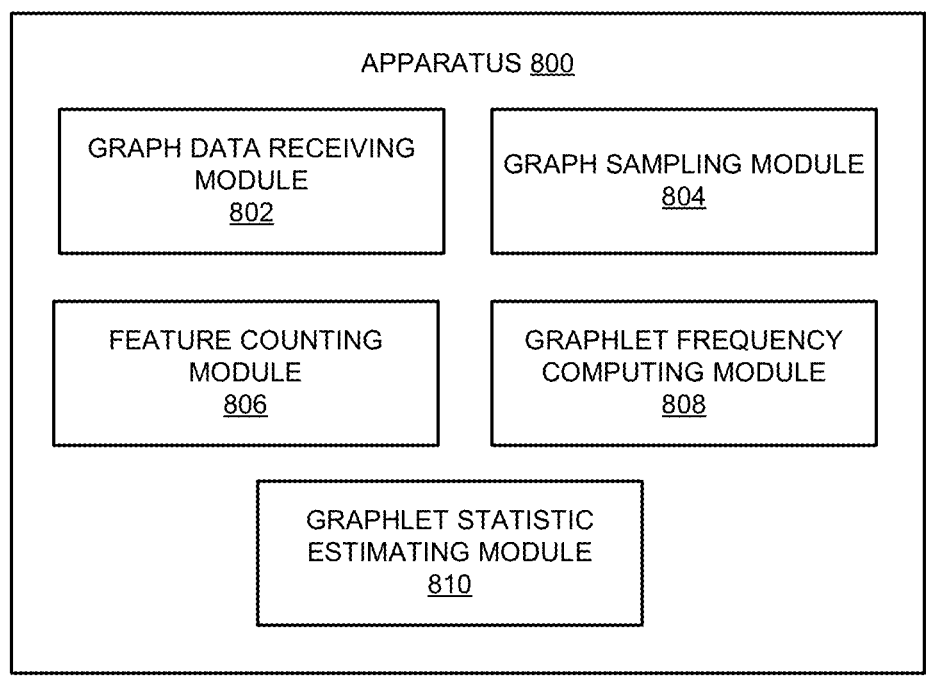
FIG. 8 presents a block diagram illustrating an exemplary apparatus for graphlet estimation, in accordance with embodiments of the present invention.

FIG. 8 presents a block diagram illustrating an exemplary apparatus 800 that facilitates graphlet estimation, in accordance with some embodiments. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a graph data-receiving module 802, a graph-sampling module 804, a feature-counting module 806, a graphlet frequency-computing module 808, and a graphlet statistic-estimating module 810. Note that apparatus 800 may also include additional modules not depicted in FIG. 8.

In some embodiments, graph data-receiving module 802 can receive data comprising a representation of vertices and edges of a graph. Graph-sampling module 804 may sample edge neighborhoods or other portions of the graph. Feature-counting module 806 may obtain an exact count of graph features in the sampled portions of the graph, for example, k-graphlets such as triangles, 2-stars, 4-cliques, or 4-cycles. Graphlet frequency-computing module 808 may compute, based on applying combinatorial relationships to the counted graph features, the occurrence frequency of graphlet patterns in the sampled portions of the graph. Graphlet statistic-estimating module 810 may compute a total number of graphlets in the graph, or other graphlet statistics or distributions. Note that graphlet estimation module 202 illustrated in FIG. 2 may provide any and all functions of the various modules depicted in FIG. 8.

Exemplary System

Figure 9:
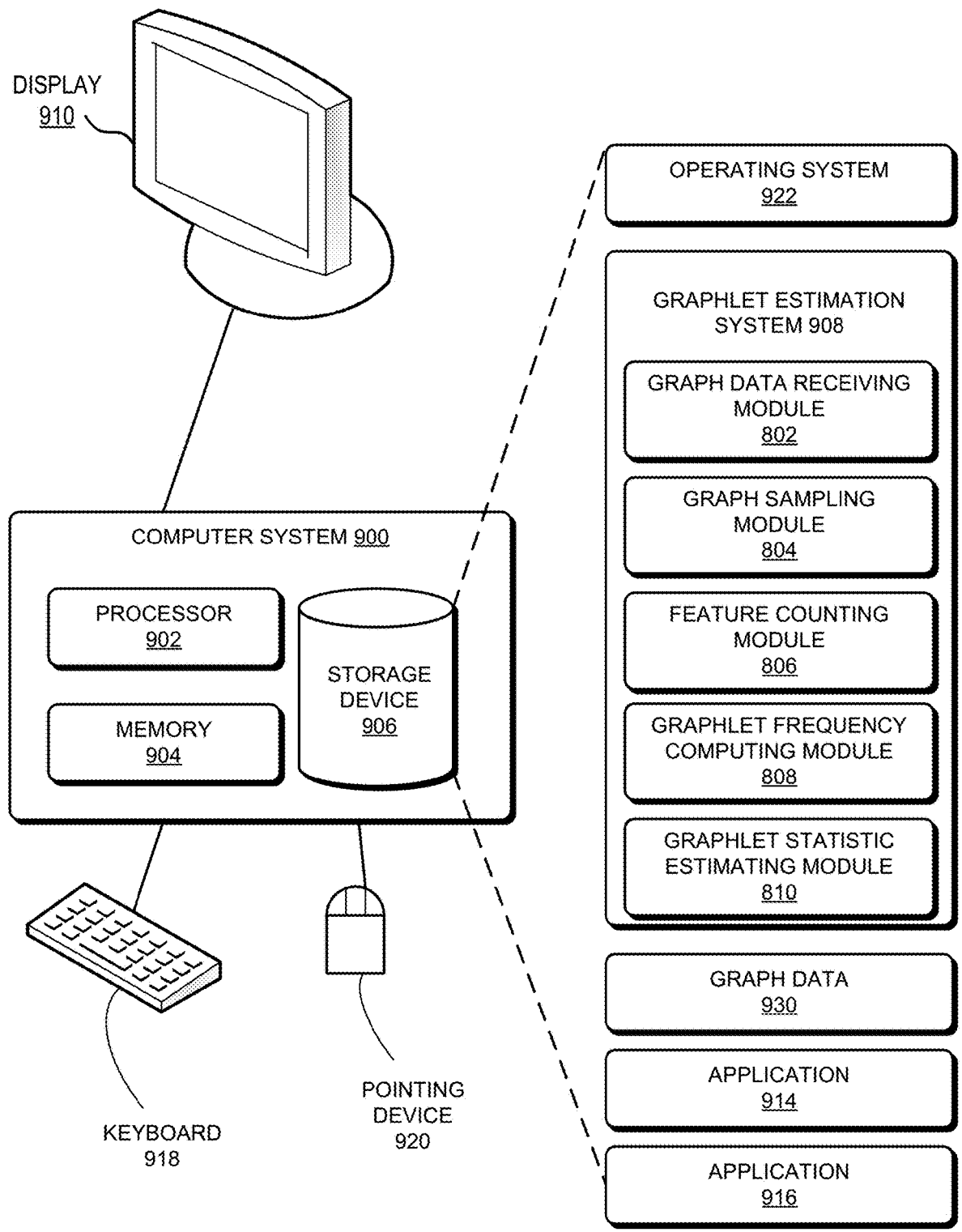
FIG. 9 presents a block diagram illustrating an exemplary computer system for graphlet estimation, in accordance with embodiments of the present invention.

FIG. 9 illustrates an exemplary graphlet estimation computer system 900, in accordance with some embodiments. In some embodiments, computer system 900 may be a server. In some embodiments, system 900 includes a processor 902, a memory 904, and a storage device 906. In some embodiments, 902 may include a set of processors. Storage device 906 may store a number of applications, such as applications 914 and 916, which may make use of graphlet estimation according to embodiments of the present invention, and operating system 922. Storage device 906 also stores graphlet estimation system 908 that may include a graph data-receiving module 802, a graph-sampling module 804, a feature-counting module 806, a graphlet frequency-computing module 808, and a graphlet statistic-estimating module 810. System 900 and/or graph data-receiving module 802 may receive or generate graph data 930 comprising vertices and edges data and may copy graph data to a memory section accessible to graphlet estimation system 908. During operation, one or more applications, such as graphlet estimation system 908, are loaded from storage device 906 into memory 904 and then executed by processor set 902. While executing the program, processor set 902 performs the aforementioned functions. System 900 may be coupled to a display 910, a keyboard 918, and a pointing device 920.

In some embodiments, graph data-receiving module 802 can receive data comprising a representation of vertices and edges of a graph. Graph-sampling module 804 may sample edge neighborhoods or other portions of the graph. Feature-counting module 806 may obtain an exact count of graph features in the sampled portions of the graph, for example, k-graphlets such as triangles, 2-stars, 4-cliques, or 4-cycles. Graphlet frequency-computing module 808 may compute, based on applying combinatorial relationships to the counted graph features, the occurrence frequency of graphlet patterns in the sampled portions of the graph. Graphlet statistic-estimating module 810 may compute a total number of graphlets in the graph, or other graphlet statistics or distributions. Note that graphlet estimation module 202 illustrated in FIG. 2 may provide any and all functions of the various modules depicted in FIG. 9.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for estimating a number of graphlets in a graph, comprising:
    obtaining, by a computer system comprising a set of processors, a data structure representing a graph comprising vertices and edges;
    performing graph sampling, using a graph sampling technique by the computer system, on the graph based on a property of the graph to obtain a subgraph of the graph wherein the subgraph comprises a subset of vertices and edges of the graph selected by the graph sampling technique;
    determining a first number of occurrences of one or more graph features in the sampled subgraph of the graph;
    determining, based on graph combinatorics, a combinatorial relationship applicable to the first number of occurrences of the one or more graph features;
    determining, based on applying the combinatorial relationship to the first number of occurrences, a second number of occurrences of a graphlet pattern in the sampled subgraph of the graph, wherein the combinatorial relationship is between the one or more graph features and the graphlet pattern, and wherein the graphlet pattern indicates a number of vertices in a graphlet and a pattern of edges between the vertices of the graphlet; and
    determining, based on the second number of occurrences, a total number of graphlets associated with the graphlet pattern in the graph by scaling up the second number of occurrences based on a topological factor.

2. The method of claim 1, further comprising determining a related local or global subgraph statistic, which includes one or more of:
    a connected graphlet frequency distribution (GFD);
    a disconnected GFD;
    a GFD associated with both connected and disconnected graphlets;
    a univariate statistic for the graphlet pattern;
    a probability density function (PDF) for the graphlet pattern;
    a cumulative distribution function (CDF) for the graphlet pattern; and
    a complementary cumulative distribution function (CCDF) for the graphlet pattern.

3. The method of claim 1, further comprising determining, using adaptive graphlet estimation, whether the sampled subgraph is sufficient, wherein the adaptive graphlet estimation comprises:
    computing an objective function based on minimizing a loss function;
    updating an error estimate based on the computed objective function;
    comparing the updated error estimate to a pre-specified error bound; and
    in response to determining that the error estimate exceeds the pre-specified error bound, adjusting the sampled subgraph of the graph to a minimal subgraph necessary to satisfy the pre-specified error bound.

4. The method of claim 1:
    wherein the sampled subgraph of the graph comprises an edge neighborhood associated with an edge that connects a first vertex to a second vertex;
    wherein the first number of occurrences includes a number of triangles including the first and second vertices and a third vertex within the edge neighborhood; and
    wherein scaling up the second number of occurrences indicates an unbiased statistical estimator of the total number of graphlets.

5. The method of claim 1, wherein the topological factor includes one or more of:
    a ratio relating a total number of edges in the graph to a number of sampled edge neighborhoods; and
    a value indicating a subtraction between a second number of graphlets associated and a second graphlet pattern.

6. The method of claim 1:

wherein the method is executed in parallel;
wherein the sampled subgraph comprises a set of multiple sampled edge neighborhoods of the graph;
wherein sampling the subgraph of the graph further comprises assigning a respective sampled edge neighborhood to a processor in the set of processors;
wherein determining the first number of occurrences comprises independently performing, by a respective processor, a partial computation within an edge neighborhood assigned to the processor; and
wherein determining the second number of occurrences comprises summing, by the computer system, the partial computations in the multiple sampled edge neighborhoods.

7. The method of claim 1, wherein the graphlet pattern includes three or fewer vertices, and wherein applying the combinatorial relationship is a constant-time computation.

8. A non-transitory computer-readable storage medium storing instructions that when executed by a computer cause the computer to perform a method for estimating a number of graphlets in a graph, the method comprising:
obtaining, by the computer, a data structure representing a graph comprising vertices and edges;
performing graph sampling, using a graph sampling technique by the computer, on the graph based on a property of the graph to obtain a subgraph of the graph, wherein the subgraph comprises a subset of vertices and edges of the graph selected by the graph sampling technique;
determining a first number of occurrences of one or more graph features in the sampled subgraph of the graph;
determining, based on graph combinatorics, a combinatorial relationship applicable to the first number of occurrences of the one or more graph features;
determining, based on applying the combinatorial relationship to the first number of occurrences, a second number of occurrences of a graphlet pattern in the sampled subgraph of the graph, wherein the combinatorial relationship is between the one or more graph features and the graphlet pattern, and wherein the graphlet pattern indicates a number of vertices in a graphlet and a pattern of edges between the vertices of the graphlet; and
determining, based on the second number of occurrences, a total number of graphlets associated with the graphlet pattern in the graph by scaling up the second number of occurrences based on a topological factor.

9. The non-transitory computer-readable storage medium of claim 8, wherein the method further comprises determining a related local or global subgraph statistic, which includes one or more of:
a connected graphlet frequency distribution (GFD);
a disconnected GFD;
a GFD associated with both connected and disconnected graphlets;
a univariate statistic for the graphlet pattern;
a probability density function (PDF) for the graphlet pattern;
a cumulative distribution function (CDF) for the graphlet pattern; and
a complementary cumulative distribution function (CCDF) for the graphlet pattern.

10. The non-transitory computer-readable storage medium of claim 8, wherein the method further comprises determining, using adaptive graphlet estimation, whether the sampled subgraph is sufficient, wherein the adaptive graphlet estimation comprises:
computing an objective function based on minimizing a loss function;
updating an error estimate based on the computed objective function;
comparing the updated error estimate to a pre-specified error bound; and
in response to determining that the error estimate exceeds the pre-specified error bound, adjusting the sampled subgraph of the graph to a minimal subgraph necessary to satisfy the pre-specified error bound.

11. The non-transitory computer-readable storage medium of claim 8:
wherein the sampled subgraph of the graph comprises an edge neighborhood associated with an edge that connects a first vertex to a second vertex;
wherein the first number of occurrences includes a number of triangles including the first and second vertices and a third vertex within the edge neighborhood; and
wherein scaling up the second number of occurrences indicates an unbiased statistical estimator of the total number of graphlets.

12. The non-transitory computer-readable storage medium of claim 8, wherein the topological factor includes one or more of:
a ratio relating a total number of edges in the graph to a number of sampled edge neighborhoods; and
a value indicating a subtraction between a second number of graphlets associated and a second graphlet pattern.

13. The non-transitory computer-readable storage medium of claim 8, wherein the graphlet pattern includes three or fewer vertices, and wherein applying the combinatorial relationship is a constant-time computation.

14. A computing system for estimating a number of graphlets in a graph, the computing system comprising:
a set of processors; and
a non-transitory computer-readable medium coupled to the set of processors storing instructions thereon that, when executed by the processors, cause the processors to perform a method for estimating a number of graphlets in a graph, the method comprising:
obtaining, by the set of processors, a data structure representing a graph comprising vertices and edges;
performing, using a graph sampling technique by the computing system, graph sampling on the graph based on a property of the graph to obtain a subgraph of the graph, wherein the subgraph comprises a subset of vertices and edges of the graph selected by the graph sampling technique;
determining a first number of occurrences of one or more graph features in the sampled subgraph of the graph;
determining, based on graph combinatorics, a combinatorial relationship applicable to the first number of occurrences of the one or more graph features;
determining, based on applying the combinatorial relationship to the first number of occurrences, a second number of occurrences of a graphlet pattern in the sampled subgraph of the graph, wherein the combinatorial relationship is between the one or more graph features and the graphlet pattern, and wherein the graphlet pattern indicates a number of vertices in a graphlet and a pattern of edges between the vertices of the graphlet; and
determining, based on the second number of occurrences, a total number of graphlets associated with the graphlet pattern in the graph by scaling up the second number of occurrences based on a topological factor.

15. The computing system of claim 14, wherein the method further comprises determining a related local or global subgraph statistic, which includes one or more of:
- a connected graphlet frequency distribution (GFD);
- a disconnected GFD;
- a GFD associated with both connected and disconnected graphlets;
- a univariate statistic for the graphlet pattern;
- a probability density function (PDF) for the graphlet pattern;
- a cumulative distribution function (CDF) for the graphlet pattern; and
- a complementary cumulative distribution function (CCDF) for the graphlet pattern.

16. The computing system of claim 14 wherein the method further comprises determining, using adaptive graphlet estimation, whether the sampled subgraph is sufficient, wherein the adaptive graphlet estimation comprises:
- computing an objective function based on minimizing a loss function;
- updating an error estimate based on the computed objective function;
- comparing the updated error estimate to a pre-specified error bound; and
- in response to determining that the error estimate exceeds the pre-specified error bound, adjusting the sampled subgraph of the graph to a minimal subgraph necessary to satisfy the pre-specified error bound.

17. The computing system of claim 14:
- wherein the sampled subgraph of the graph comprises an edge neighborhood associated with an edge that connects a first vertex to a second vertex;
- wherein the first number of occurrences includes a number of triangles including the first and second vertices and a third vertex within the edge neighborhood; and
- wherein scaling up the second number of occurrences indicates an unbiased statistical estimator of the total number of graphlets.

18. The computing system of claim 14, wherein the topological factor includes one or more of:
- a ratio relating a total number of edges in the graph to a number of sampled edge neighborhoods; and
- a value indicating a subtraction between a second number of graphlets associated and a second graphlet pattern.

19. The computing system of claim 14, wherein the set of processors is configured to execute the method in parallel,
- wherein the sampled subgraph comprises a set of multiple sampled edge neighborhoods of the graph;
- wherein sampling the subgraph of the graph further comprises assigning a respective sampled edge neighborhood to a respective processor in the set of processors;
- wherein determining the first number of occurrences comprises independently performing, by a respective processor, a partial computation within its an edge neighborhood assigned to the processor; and
- wherein determining the second number of occurrences comprises summing, by the computer system, the partial computations in the multiple sampled edge neighborhoods.

20. The computing system of claim 14, wherein the graphlet pattern includes three or fewer vertices, and wherein applying the combinatorial relationship is a constant-time computation.

* * * * *